United States Patent
Baggott

(10) Patent No.: US 9,628,524 B2
(45) Date of Patent: Apr. 18, 2017

(54) TAGGING POSTS WITHIN A MEDIA STREAM

(71) Applicant: Google Inc., Mountain View, CA (US)

(72) Inventor: George Thomas Baggott, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 675 days.

(21) Appl. No.: 13/722,895

(22) Filed: Dec. 20, 2012

(65) Prior Publication Data

US 2014/0181197 A1 Jun. 26, 2014

(51) Int. Cl.
| | |
|---|---|
| G06F 15/16 | (2006.01) |
| H04L 29/06 | (2006.01) |
| G06Q 10/10 | (2012.01) |
| G06Q 50/00 | (2012.01) |

(52) U.S. Cl.
CPC .......... *H04L 65/403* (2013.01); *G06Q 10/10* (2013.01); *G06Q 50/01* (2013.01)

(58) Field of Classification Search
CPC ....... H04L 65/403; G06Q 10/10; G06Q 50/01
See application file for complete search history.

(56) References Cited

U.S. PATENT DOCUMENTS

| | | | |
|---|---|---|---|
| 8,055,688 B2 | 11/2011 | Giblin | |
| 2007/0250901 A1 | 10/2007 | McIntire et al. | |
| 2009/0164484 A1 | 6/2009 | Horowitz et al. | |
| 2009/0248516 A1 | 10/2009 | Gross | |
| 2009/0265737 A1* | 10/2009 | Issa ................... | G06F 17/30817 725/38 |
| 2010/0095211 A1 | 4/2010 | Kenvin | |
| 2010/0119215 A1 | 5/2010 | Chien et al. | |
| 2012/0036423 A1* | 2/2012 | Haynes et al. ............... | 715/230 |
| 2012/0072941 A1 | 3/2012 | Thornberry et al. | |
| 2012/0114297 A1 | 5/2012 | Adhikari et al. | |
| 2012/0148213 A1 | 6/2012 | Bamba et al. | |
| 2012/0308206 A1 | 12/2012 | Kulas | |
| 2013/0275519 A1* | 10/2013 | Nichols ........................ | 709/206 |
| 2014/0074855 A1* | 3/2014 | Zhao et al. ................... | 707/746 |
| 2014/0089801 A1* | 3/2014 | Agrawal ....................... | 715/719 |

OTHER PUBLICATIONS

International Preliminary Report on Patentability for PCT/US2013/076164, mailed on Jul. 2, 2015, 8 pages.

* cited by examiner

*Primary Examiner* — Arvin Eskandarnia
*Assistant Examiner* — Austin Moreau
(74) *Attorney, Agent, or Firm* — Patent Law Works LLP

(57) ABSTRACT

The present disclosure comprises systems and methods for tagging a post to a specific scene in a media stream. The systems and methods receive a post from a user to a specific scene in a media stream, tag the post to the specific scene in the media stream, generate a post indication/message indicating a post is tagged to the specific scene, receive a response to the post indication/message, surface the post, determine whether to display the media from beginning or from the tagged scene, locate the scene to which the post is tagged, display the media from the tagged scene, generate a spoiler alert, display spoiler alert, receive a response to the spoiler alert, and remove the alert.

17 Claims, 9 Drawing Sheets

TAGGING POSTS WITHIN A MEDIA STREAM

BACKGROUND

The present disclosure relates to comments provided on media streams in online communities or the like, for example, a social network. In particular, the present disclosure relates to technology to enable users to comment at particular points in a media stream, for example, of video, audio, or text, etc.

Over the last decade, sharing media over social networks has become increasingly popular. Social network users post videos and other media streams in online communities, for example, a social network or the like. Moreover, within social networks, users frequently comment on different videos, audio, or text provided by their friends or otherwise. This is a mechanism by which users share their status and opinions quickly and conveniently with others. Yet existing systems, although they allow users to pause at a particular instance within a video stream, only allow users to post their comments or opinions for the entire stream of video, audio, or text. In instances where a user only wishes to comment on a particular portion or scene within a media stream, there is no present mechanism to comment only on the instance of interest.

SUMMARY

The present disclosure overcomes the deficiencies and limitations of the prior art by providing technologies comprising systems and methods for tagging a post or providing a comment to a specific scene, portion, or instance in a media stream (for example, video, audio, or text). Specifically, this technology comprises systems and methods for receiving a post or comment from a user referring to a specific scene or instance (a point, a portion, or even an entire media item) in a media stream, tagging the post or comment to the specific scene in the media stream, generating a post indication/message indicating a post is tagged to the specific scene (point, portion, instance etc.), displaying the post indication/message, receiving a response to the post indication/message, and surfacing the post in response to the users response to the post indication/message. As examples, a user may consume the media stream by either viewing, listening to, or reading the media stream.

In some embodiments, this technology comprises systems and methods for displaying a post or comment at a beginning or initial point in the media stream. In other embodiments, the technology comprises systems and methods for executing a pause to the media stream at an instance or tag point in the stream and tagging a post to the tag point in the media stream.

In some embodiments, this technology also comprises systems and methods for beginning a media stream from a tagged point. Specifically, this technology comprises systems and methods for receiving a media stream, receiving a post from one or more users at a tag point within the media stream, beginning the media stream from the tag point, and displaying the media stream from the tag point.

In some embodiments, this technology also comprises systems and methods for generating a spoiler alert referring to a post. Specifically, this technology comprises systems and methods for receiving a media stream, receiving a post from one or more users at a tag point, generating a spoiler alert indicating the post is tagged for the tag point in the media stream, and displaying the spoiler alert.

In some embodiments, the technology comprises methods for receiving a response to the spoiler alert and displaying the post. In other embodiments, the technology comprises methods for removing the spoiler alert in response to viewing the media stream.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

In some embodiments, this technology comprises systems and methods for tagging a post or providing a comment to a specific scene, portion, instance, point, or an entire media item in a media stream (for example, video, audio, or text) or surfacing a post at a specific point, scene, portion, instance or media item in a media stream. For example, a media stream may include video streams, audio streams (for example, music, podcasts, audio books, etc.), and text streams (for example, ebooks). For example, posts may be surfaced in the margin of an ebook. Users of online communities consume media, via either viewing, listening to, or reading media streams. Specifically, this technology comprises systems and methods for receiving a post from one or more users, tagging the post to a tag point in the media stream, generating a post indication/message detailing the tagged post, displaying the post indication/message at the tag point, receiving a response to the post indication/message, and surfacing the tagged post after receiving a response to the post indication/message. It should be recognized that the tag point may be a specific point, a scene, a region, a portion, instance, or even an entire item in the media stream (for example, a video). Moreover, any reference to a specific point here includes any of the other examples indicated. In some implementations, a region may include a start point and a stop point relating to the media stream. In some instances, if the start point equals the stop point or they are the same, they reduce to a single specific point.

In some embodiments, this technology comprises systems and methods for starting or initiating a media stream from a tagged point. Specifically, this technology comprises systems and methods for receiving a media stream, receiving a post from one or more users at a tag point, starting the media stream from the tag point, and displaying the media stream from the tag point.

In some embodiments, this technology comprises systems and methods for generating a spoiler alert referring to a post. Specifically, this technology comprises systems and methods for receiving a media stream, receiving a post from one or more users at a tag point, generating a spoiler alert, and displaying the spoiler alert. The technology described here may be used in any online community, for example, social networks, email networks, blogs, web-forums, etc., where media streams are provided, for tagging posts within the media streams. The technology is described here in the context of a social network as one example.

Figure 1:
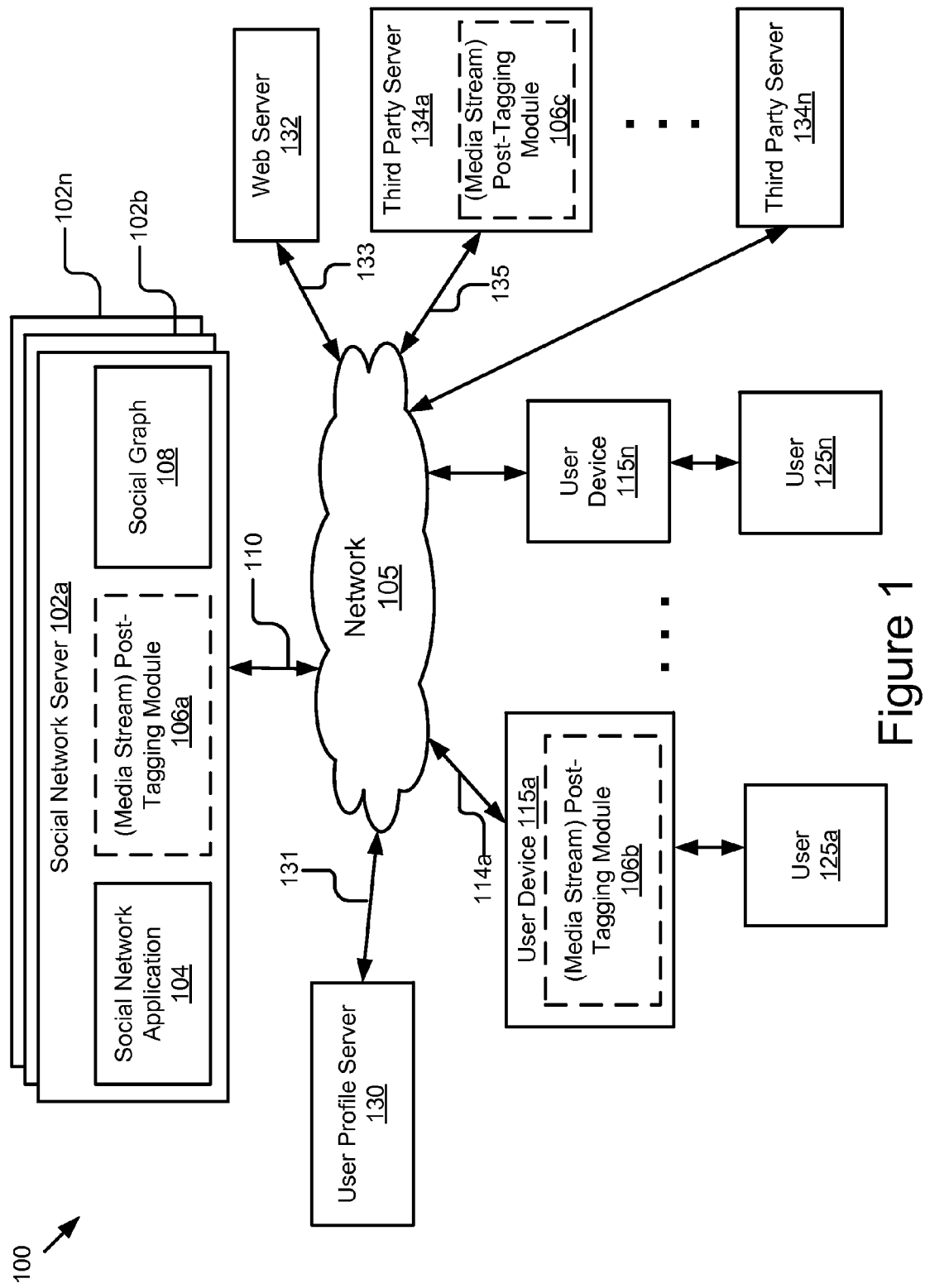
FIG. 1 is a high-level block diagram illustrating some embodiments of example systems for tagging a post to a specific region, area, or point in a media stream (for example, a point or particular scene in the media stream or an entire video), including a post-tagging module (for a media stream).

FIG. 1 is a high-level block diagram illustrating some example embodiments of systems for tagging a post or comment to a specific point, region, area, instance, portion or entire media item in a media stream within an online service or community, for example, a social network. The system 100 illustrated in FIG. 1 provides system architecture for tagging a post to a specific point in a media stream. The system 100 includes one or more social network servers 102a, 102b, through 102n, that may be accessed via user devices 115a through 115n, which are used by users 125a through 125n, to connect to any one of the social network servers 102a, 102b, through 102n. These entities are communicatively coupled via a network 105. Although only two user devices 115a through 115n are illustrated, persons of ordinary skill in the art should recognize that any numbers of user devices 115n may be used by any number of users 125n.

Moreover, those skilled in the art should recognize that while the present disclosure is described below primarily in the context of tagging a post to a specific point, region, area, instance, portion, or entire item in a video stream, the present disclosure may be applicable to other media, including, but not limited to, audio streams, text streams, etc. For ease of understanding and brevity, the present disclosure is described in reference to tagging a post to a specific point, region, area, instance, or entire item in a media stream.

The user devices 115a through 115n in FIG. 1 are illustrated by way of example. Although FIG. 1 illustrates only two devices, the present disclosure applies to any system architecture having one or more user devices 115, therefore, any number of user devices 115n may be used. Furthermore, while only one network 105 is illustrated as coupled to the user devices 115a through 115n, the social network servers, 102a-102n, the user profile server 130, the web server 132, and third party servers 134a through 134n, in practice, any number of networks 105 may be connected to these entities. In addition, although only two third party servers 134a through 134n are shown, the system 100 may include any number of third party servers 134n.

In some embodiments, the social network server 102a is coupled to the network 105 via a signal line 110. The social network server 102a includes a social network application 104, which comprises the software routines and instructions to operate the social network server 102a and its functions and operations. Although only one social network server 102a is described here, persons of ordinary skill in the art should recognize that multiple servers may be present, as illustrated by social network servers 102b through 102n, each with functionality similar to social network server 102a or different.

The term "social network" as used here encompasses its plain and ordinary meaning including, but not limited to, any type of social structure where the users are connected by a common feature or link. The common feature includes relationships/connections, e.g., friendship, family, work, a similar interest, etc. The common features are provided by one or more social networking systems, such as those included in the system 100, including explicitly-defined relationships and relationships implied by social connections with other online users, where the relationships form the social graph 108.

The term "social graph" as used here encompasses its plain and ordinary meaning including, but not limited to, a set of online relationships between users, such as provided by one or more social networking systems, such as the social network system 100, including explicitly-defined relationships and relationships implied by social connections with other online users, where the relationships form a social graph 108. In some examples, the social graph 108 may reflect a mapping of these users and how they are related or connected.

It should be understood that the social network server 102a and the social network application 104 are representative of a single social network. Each of the plurality of social network servers 102a, 102b through 102n, is coupled to the network 105, each having its own server, application, and social graph. For example, a first social network hosted on a social network server 102a may be directed to business networking, a second on a social network server 102b directed to or centered on academics, a third on a social network server 102c (not separately shown) directed to local business, a fourth on a social network server 102d (not separately shown) directed to dating, and yet others on social network server (102n) directed to other general interests or perhaps a specific focus.

A user profile server 130 is illustrated as a stand-alone server in FIG. 1. In other embodiments of the system 100, all or part of the user profile server 130 may be part of the social network server 102a. The user profile server 130 is connected to the network 105 via a line 131. The user profile server 130 has profiles for all the users that belong to a particular social network 102a-102n. One or more third party servers 134a through 134n are connected to the network 105, via signal line 135. A web server 132 is connected, via line 133, to the network 105.

The social network server 102a includes a (media stream) post-tagging module 106a, to which user devices 115a through 115n are coupled via the network 105. In particular, user device 115a is coupled, via line 114a, to the network 105. The user 125a interacts via the user device 115a to access the (media stream) post-tagging module 106a to tag a post to a specific point, region, area, instance, portion, or entire item (for example, an entire video) in a media stream. Persons of ordinary skill in the art should recognize that the (media stream) post-tagging module 106 or certain components of it may be stored in a distributed architecture in any of the social network server 102, the third party server 134, and the user device 115. In other embodiments, the (media stream) post-tagging module 106 may be included, either partially or entirely, in any one or more of the social network server 102, the third party server 134, and the user device 115.

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network.

The network 105 is of conventional type, wired or wireless, and may have any number of configurations such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In other embodiments, the network 105 may be a peer-to-peer network. The network 105 may also be coupled to or include portions of one or more telecommunications networks for sending data in a variety of different communication protocols.

In yet other embodiments, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In some embodiments, the social network servers, 102a-102n, the user profile server 130, the web server 132, and the third party servers 134a through 134n are hardware servers including a processor, memory, and network communication capabilities. One or more of the users 125a through 125n access any of the social network servers 102a through 102n, via browsers in their user devices and via the web server 132. Information is retrieved only after receiving permission from the one or more users to protect user privacy.

By way of one example, in some embodiments of the system, information on particular users (125a through 125n) of a social network 102a through 102n, who are viewing the media stream, is retrieved from the social graph 108.

Figure 2A:
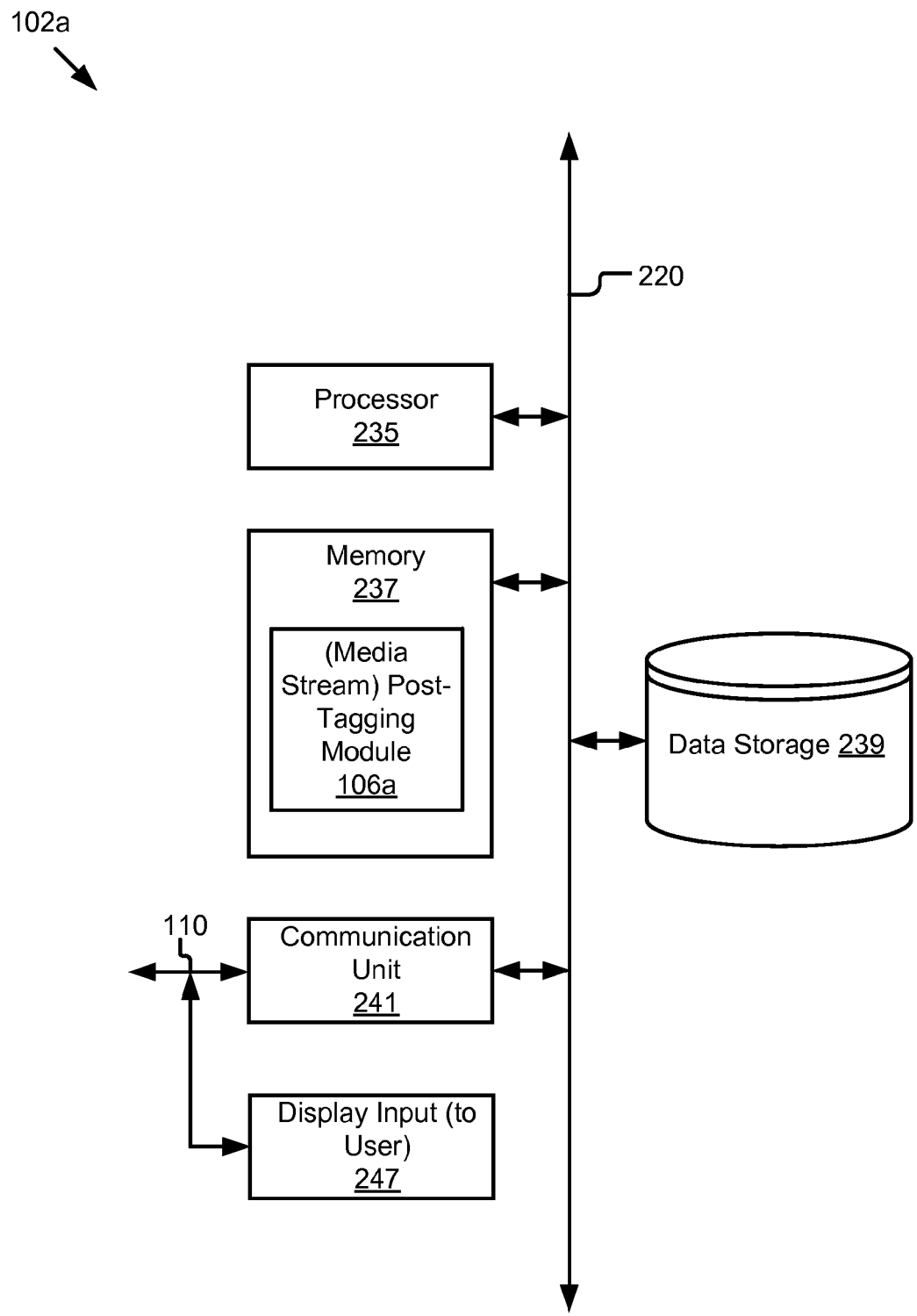
FIG. 2A is a block diagram illustrating the hardware components in some example embodiments of the systems shown in FIG. 1.

FIG. 2A is a block diagram illustrating some embodiments of the hardware architecture of the social network server 102a including the (media stream) post-tagging module 106a (for brevity, referred to as post-tagging module throughout this description). In FIG. 2A, like reference numerals have been used to reference like components with the same or similar functionality that has been described above with reference to FIG. 1. Since those components have been described above that description is not repeated here. The social network server 102a generally comprises one or more processors, although only one processor 235 is illustrated in FIG. 2A. The processor is coupled, via a bus 220, to memory 237 and data storage 239, which stores any post information obtained from users, received from any of the other sources identified above. In some embodiments, post-tagging module 106a is stored in the memory 237.

It should be noted that information that may be retrieved for particular users is only upon obtaining the necessary permissions from the users, in order to protect user privacy and sensitive information of the users.

A user 125a, via a user device 115a, either executes or sends a post to a specific point, region or area in a particular media stream or views the post tagged to a specific point region, or area in a media stream, via communication unit 241. The post-tagging module 106a, 106b, and 106c may reside, in their entirety or parts of them, in the user's device (115a through 115n), in the social network server 102a (through 102n), or alternatively, in a separate server, for example the third party server 134 (FIG. 1). The user device 115a communicates with the social network server 102a using the communication unit 241, via signal line 110.

The processor 235 processes data signals and program instruction received from the memory 237 and the data storage 239. The processor 235 may comprise various computing architectures including a complex instruction set computer (CISC) architecture, a reduced instruction set computer (RISC) architecture, or an architecture implementing a combination of instruction sets.

The memory 237 is non-transitory storage medium. The memory 237 stores the instructions and/or data for the (media stream) post-tagging module 106a, which may be executed by the processor 235. In some embodiments, the instructions and/or data stored on the memory 237 comprises code for performing any and/or all of the techniques described herein. The memory 237 is a dynamic random access memory (DRAM) device, a static random access memory (SRAM) device, flash memory or some other memory device known in the art.

The data storage 239 stores the data and program instructions that may be executed by the processor 235. In some embodiments, the data storage 239 includes a variety of non-volatile memory permanent storage device and media such as a hard disk drive, a floppy disk drive, a CD-ROM device, a DVD-ROM device, a DVD-RAM device, a DVD-RW device, a flash memory device, or some other non-volatile storage device known in the art.

The communication unit 241 facilitates the communication between the user device 115a and the server 102a over the network 105. A user 125a, via the user device 115a, indicates or posts a message to the server 102a and receives information from the server 102a via communication unit 241.

The display input (to user) 247 displays the information received from the social network server 102a to the users. In some embodiments, the display input (to user) 247 displays the appropriate user interface for an action of posting messages to the user.

Figure 2B:
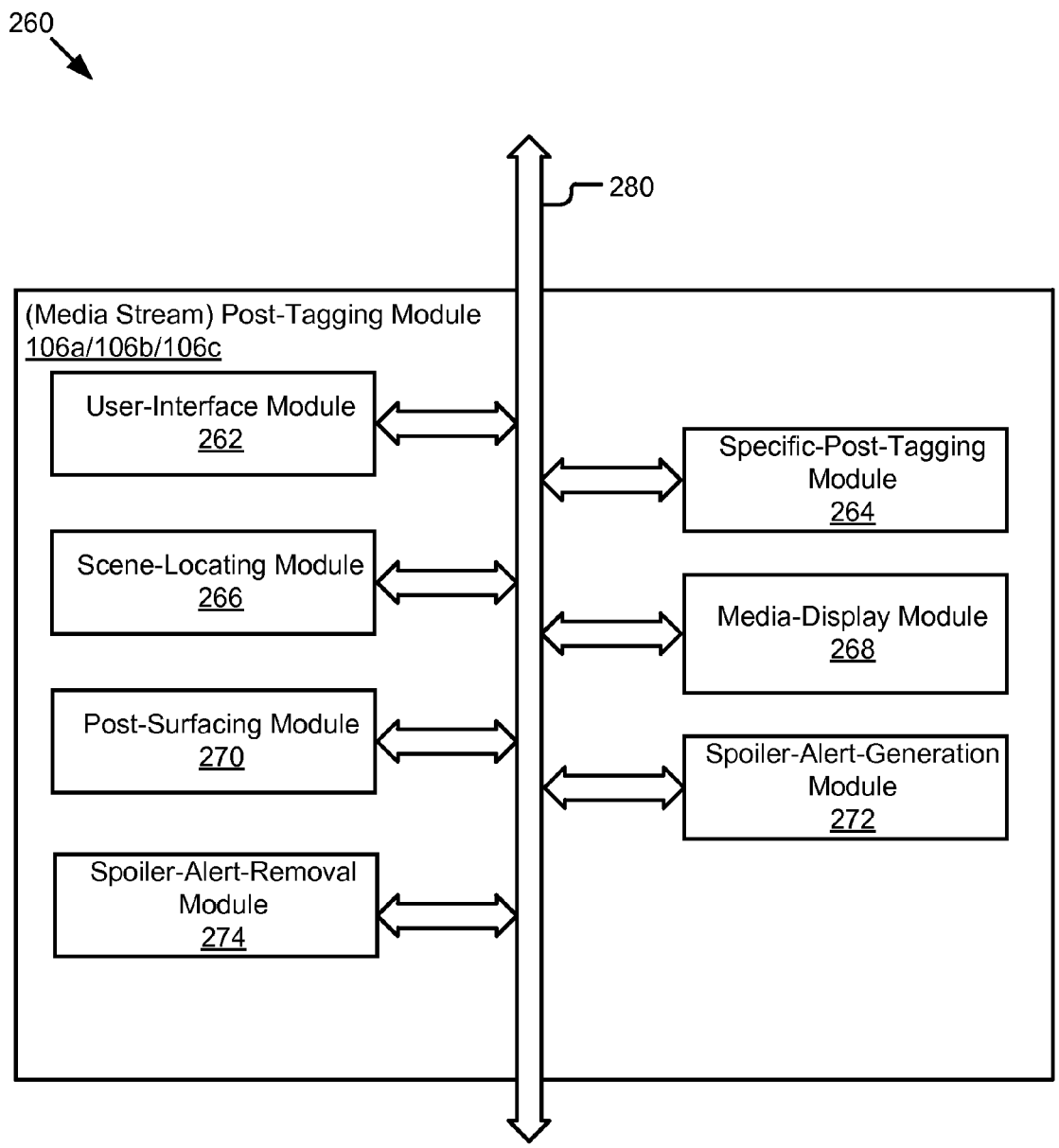
FIG. 2B is a block diagram illustrating some example embodiments of the post-tagging module and its software components.

Referring now to FIG. 2B, like reference numerals have been used to reference like components with the same or similar functionality that has been described above with reference to FIGS. 1 and 2A. Since those components have been described above that description is not repeated here. FIG. 2B illustrates one embodiment of the post-tagging module 106a, 106b, and 106c. The post-tagging module 106a, 106b, and 106c, indicated here by reference numeral 260, include various applications or engines that are programmed to perform the functionalities described here. The post-tagging module 106a, 106b, and 106c tags the posts received to specific points, regions, or areas (portions, instances, and entire media items as well) in media streams and displays the posts to users as the users view the media streams in the event the media streams are video or text and listen to media streams that are audio. In some embodiments, the post-tagging module 106a, 106b, or/and 106c enables a user to choose to view the media either from the start or beginning of the media stream, or from the tagged point in the media stream. In some embodiments, the module "surfaces" or brings to the forefront, a post in the media stream, which notifies a user of the existence of the post tagged at a specific or particular point of the media stream. A user may pause and read the post, and may also add his/her comments to the post. In some embodiments, the post-tagging module 106a, 106b, or/and 106c generates an automatic spoiler alert that indicates that a post is tagged to a specific point, region, or area in the media stream. Once the user decides to view the post, the spoiler alert may be removed.

The post-tagging module 106*a*/106*b*/106*c* may include various modules or engines: a user-interface module 262, a specific-post-tagging module 264, a scene-locating module 266, a media-display module 268, a post-surfacing module 270, a spoiler-alert-generation module 272, and a spoiler-alert-removal module 274, any one or all of which are communicatively coupled over a software communication mechanism 280.

The user-interface module 262 may be software including routines for generating a user interface. In some implementations, the user-interface module 262 can be a set of instructions executable by the processor 235 to provide the functionality described below for generating a user interface for displaying the media and the posts. In other implementations, the user-interface module 262 can be stored in the memory 237 of the social network server 102 and/or the third party server 134 and can be accessible and executable by the processor 235. In either implementation, the user-interface module 262 can be adapted for cooperation and communication with the processor 235, the communication unit 241, data storage 239 and other components of the social network server 102 and/or the third party server 134 via the bus 220.

The user-interface module 262 displays the media and the posts to one or more users (via user devices) of the social network. In some embodiments, the user-interface module 262 displays the posts first and displays the media either from the beginning or from the points in the media stream to which the posts are tagged. In some embodiments, the user-interface module 262 displays the post indication/message after the media stream has reached the one or more tagged points in the media stream. In some embodiments, the user-interface module 262 displays spoiler alerts that indicate posts at specific points, regions, or areas, in the media stream.

The specific-post-tagging module 264 may be software including routines for tagging a post. In some implementations, the specific-post-tagging module 264 can be a set of instructions executable by the processor 235 to provide the functionality described below for tagging a post to a specific point in a media stream. In other implementations, the specific-post-tagging module 264 can be stored in the memory 237 of the social network server 102 and/or the third party server 134 and can be accessible and executable by the processor 235. In either implementation, the specific-post-tagging module 264 can be adapted for cooperation and communication with the processor 235, the communication unit 241, data storage 239 and other components of the social network server 102 and/or the third party server 134 via the bus 220.

The specific-post-tagging module 264 receives a post from a user related to a specific scene in the media stream and tags the post to the specific scene. In some embodiments, the specific-post-tagging module 264 generates a post indication/message to notify a user of a post that is tagged at a specific point within a media stream.

The scene-locating module 266 may be software including routines for locating a scene. In some implementations, the scene-locating module 266 can be a set of instructions executable by the processor 235 to provide the functionality described below for locating a scene within a media stream. In other implementations, the scene-locating module 266 can be stored in the memory 237 of the social network server 102 and/or the third party server 134 and can be accessible and executable by the processor 235. In either implementation, the scene-locating module 266 can be adapted for cooperation and communication with the processor 235, the communication unit 241, data storage 239 and other components of the social network server 102 and/or the third party server 134 via the bus 220.

The scene-locating module 266 locates the specific scene in the media stream to which a post is tagged and sends the location of the specific scene to the user-interface module 262 to display the media stream starting from the specific scene.

The media-display module 268 may be software including routines for displaying media. In some implementations, the media-display module 268 can be a set of instructions executable by the processor 235 to provide the functionality described below for displaying one or more media streams. In other implementations, the media-display module 268 can be stored in the memory 237 of the social network server 102 and/or the third party server 134 and can be accessible and executable by the processor 235. In either implementation, the media-display module 268 can be adapted for cooperation and communication with the processor 235, the communication unit 241, data storage 239 and other components of the social network server 102 and/or the third party server 134 via the bus 220.

The media-display module 268 receives the media stream from the one or more servers in the system 100 (FIG. 1). In some embodiments, the media-display module 268 sends the media stream to the user-interface module 262 for display.

The post-surfacing module 270 may be software including routines for surfacing a post. In some implementations, the post-surfacing module 270 can be a set of instructions executable by the processor 235 to provide the functionality described below for surfacing a post within a media stream. In other implementations, the post-surfacing module 270 can be stored in the memory 237 of the social network server 102 and/or the third party server 134 and can be accessible and executable by the processor 235. In either implementation, the post-surfacing module 270 can be adapted for cooperation and communication with the processor 235, the communication unit 241, data storage 239 and other components of the social network server 102 and/or the third party server 134 via the bus 220.

The post-surfacing module 270 surfaces a post after the media stream reaches the corresponding tagged point. In some embodiments, the post-surfacing module 270 surfaces the post after receiving a response to the post indication/message. In yet other embodiments, the indication/message may be configured as a user's profile information that is displayed at the bottom of the screen. In other embodiments, the indication/message may be configured as a summary of the post. For example, a user may watch a video in which a friend has posted content at a tagged point in the video. When the video gets to the tagged point, the user may be notified that there is a post from the friend (for example, users may see their friend's profile picture at the bottom of the screen including a brief description of the post). In some embodiments, users may view comments from their friends as well as celebrities.

The spoiler-alert-generation module 272 may be software including routines for generating a spoiler alert. In some implementations, the spoiler-alert-generation module 272 can be a set of instructions executable by the processor 235 to provide the functionality described below for generating a spoiler alert for a post within a media stream. In other implementations, the spoiler-alert-generation module 272 can be stored in the memory 237 of the social network server 102 and/or the third party server 134 and can be accessible and executable by the processor 235. In either implementation, the spoiler-alert-generation module 272 can be adapted for cooperation and communication with the processor 235, the communication unit 241, data storage 239 and other components of the social network server 102 and/or the third party server 134 via the bus 220.

The spoiler-alert-generation module 272 generates a spoiler alert that indicates the post is tagged to a specific scene in the media stream. The post may be revealed once the viewer indicates that he/she would like to view the post. This prevents important information (for example, the final score of a football game in the event that users are viewing a football game) from being displayed too early or soon. In some implementations, the spoiler alert may hide portions of the content and display other details (e.g., as a "teaser"). For example, the spoiler alert may reveal one or more of the author, name of the media stream, names of the commenters, the location in the media stream, etc. while withholding displaying the content.

In some implementations, the spoiler-alert-generation module 272 may generate a spoiler alert for display in a user's social network feed (e.g., stream of data (posts, links, images, videos, etc.)) from one or more users in the social graph 108. For example, a user may receive a post from a friend in the social network feed and the spoiler-alert-generation module 272 may generate a spoiler alert for blocking content displayed to the user via the social network feed.

The spoiler-alert-removal module 274 may be software including routines for removing a spoiler alert. In some implementations, the spoiler-alert-removal module 274 can be a set of instructions executable by the processor 235 to provide the functionality described below for removing a spoiler alert within a media stream. In other implementations, the spoiler-alert-removal module 274 can be stored in the memory 237 of the social network server 102 and/or the third party server 134 and can be accessible and executable by the processor 235. In either implementation, the spoiler-alert-removal module 274 can be adapted for cooperation and communication with the processor 235, the communication unit 241, data storage 239 and other components of the social network server 102 and/or the third party server 134 via the bus 220.

The spoiler-alert-removal module 274 removes the spoiler alert for the viewers that have already viewed the media (and therefore, do not need a spoiler alert). For the viewers who have not already viewed the media, the spoiler alert may be provided for display. For example, a user may view a link to a baseball game on a social network (while a friend's comments about the game may be hidden via the spoiler alert). The user may be watching the baseball game and may view a friend's comment about a particular play immediately after viewing the play. The user may also optionally execute a pause to the baseball game and take a moment or two to reply to the comment. In some instances, the user may also execute a pause to the baseball game at any point and may start a new conversation at that point in the video stream. In some implementations the media stream may begin playing immediately or automatically after the spoiler alert is removed.

Software communication mechanism 280 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.).

The software communication can be implemented on any underlying hardware, such as a network, the Internet, a bus 220 (FIG. 2A), a combination thereof, etc.

Figure 3A:
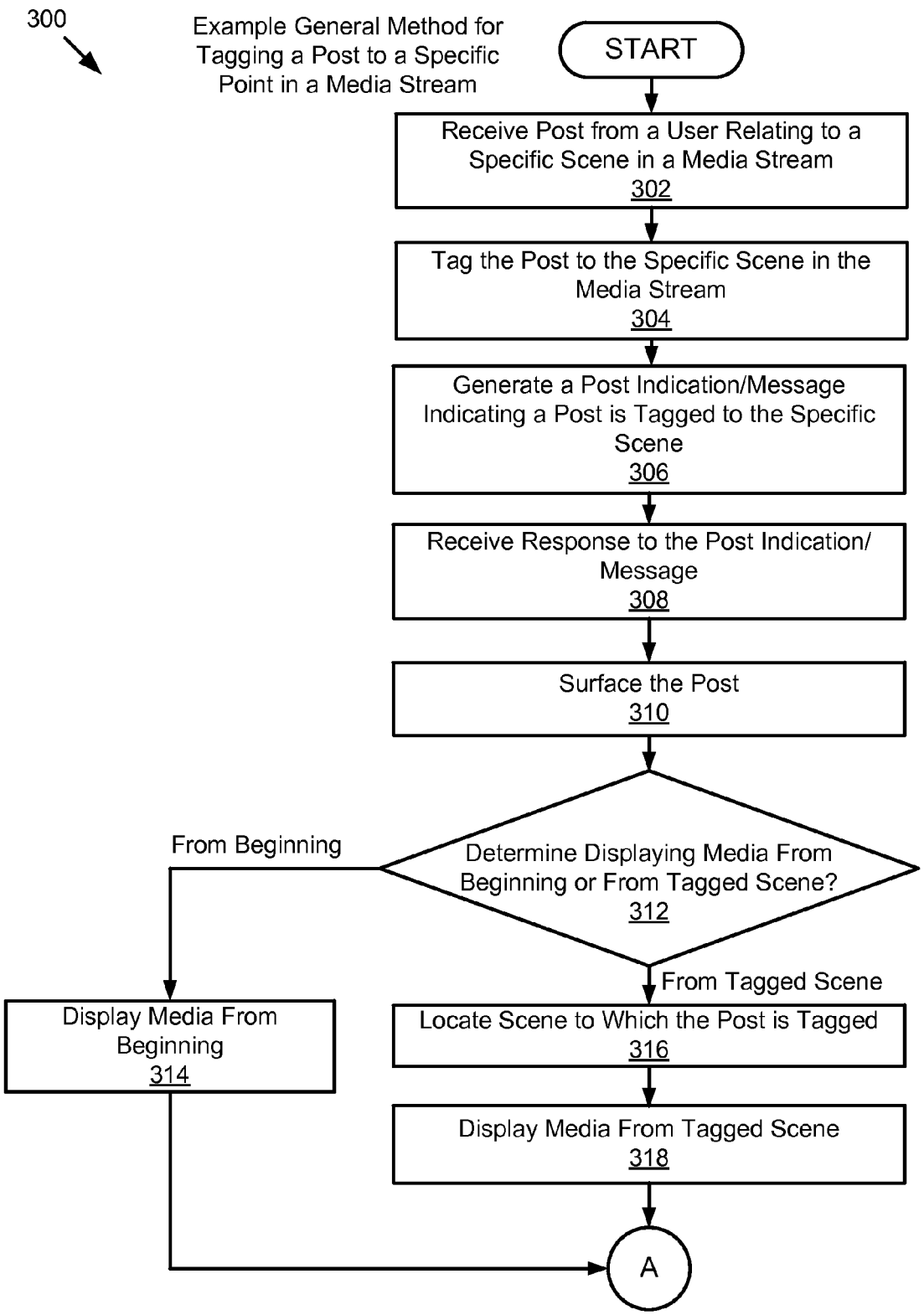
FIG. 3A is the first half of a flow chart illustrating some example embodiments of a general method for tagging a post to a specific region, area, or point in a media stream.

FIG. 3A is a flow chart illustrating an example of a general method 300 for tagging a post to a specific point in a media stream. It should be understood that the order of the operations in FIG. 3A is merely by way of example and may be performed in different orders than those that are illustrated and some operations may be excluded, and different combinations of the operations may be performed. The method 300 starts and proceeds to the block 302 (FIG. 3A), at which stage, the specific-post-tagging module 264 receives the post from a user referring to a specific scene in a media stream. The method 300 proceeds to the block 304, at which stage, the specific-post-tagging module 264 tags the post to the specific scene in the media stream. The method 300 proceeds to the block 306, at which stage, the specific-post-tagging module 264 generates a post indication/message indicating a post is tagged to the specific scene once the media stream reaches the specific scene.

Figure 3B:
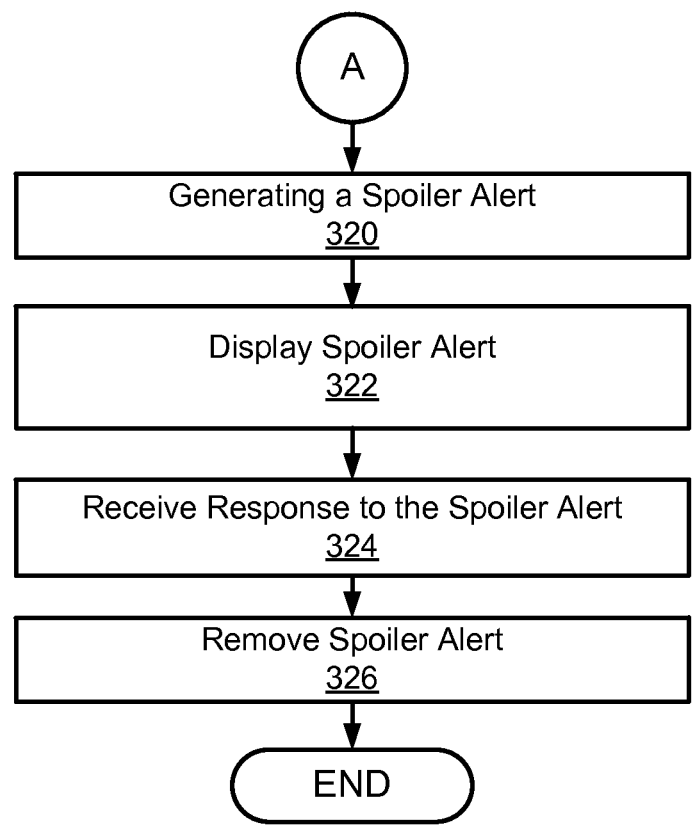
FIG. 3B is the second half of a flow chart illustrating some example embodiments of a general method for tagging a post to a specific region, area, or point in a media stream.

The method 300 proceeds to the block 308, at which stage, the specific-post-tagging module 264 receives a response (for example, from a user) to the post indication/message. The method 300 proceeds to the block 310, at which stage, the post-surfacing module 270 surfaces the post based on the response. The method 300 proceeds to the block 312, at which stage, the scene-locating module 266 determines whether the media is to be displayed from the start or beginning of the media stream or from the tagged scene. If the media is determined to be displayed from the beginning, the method 300 proceeds to the block 314, at which stage, the media-display module 268 sends the media stream to the user-interface module 262 for display from the beginning of the stream. The method 300 then proceeds to the block 320 (FIG. 3B). If it is determined that the media should be displayed from the tagged scene, the method 300 proceeds to the block 316, at which stage, the scene-locating module 266 locates the scene to which the post is tagged. The method 300 proceeds to the block 318, at which stage, the media-display module 268 sends the media stream to the user-interface module 262 for display starting from the tagged scene.

Continuing, the method 300 proceeds to the block 320 (FIG. 3B), at which stage, the spoiler-alert-generation module 272 generates a spoiler alert indicating there is a post tagged to the specific scene. The method 300 proceeds to the block 322, at which stage, the user-interface module 262 displays the spoiler alert. The method 300 proceeds to the block 324, at which stage, the spoiler-alert-remover module 274 receives a response to the spoiler alert. The method 300 proceeds to the block 326, at which stage, the spoiler-alert-removal module 274 removes the spoiler alert from the media stream.

Figure 4:
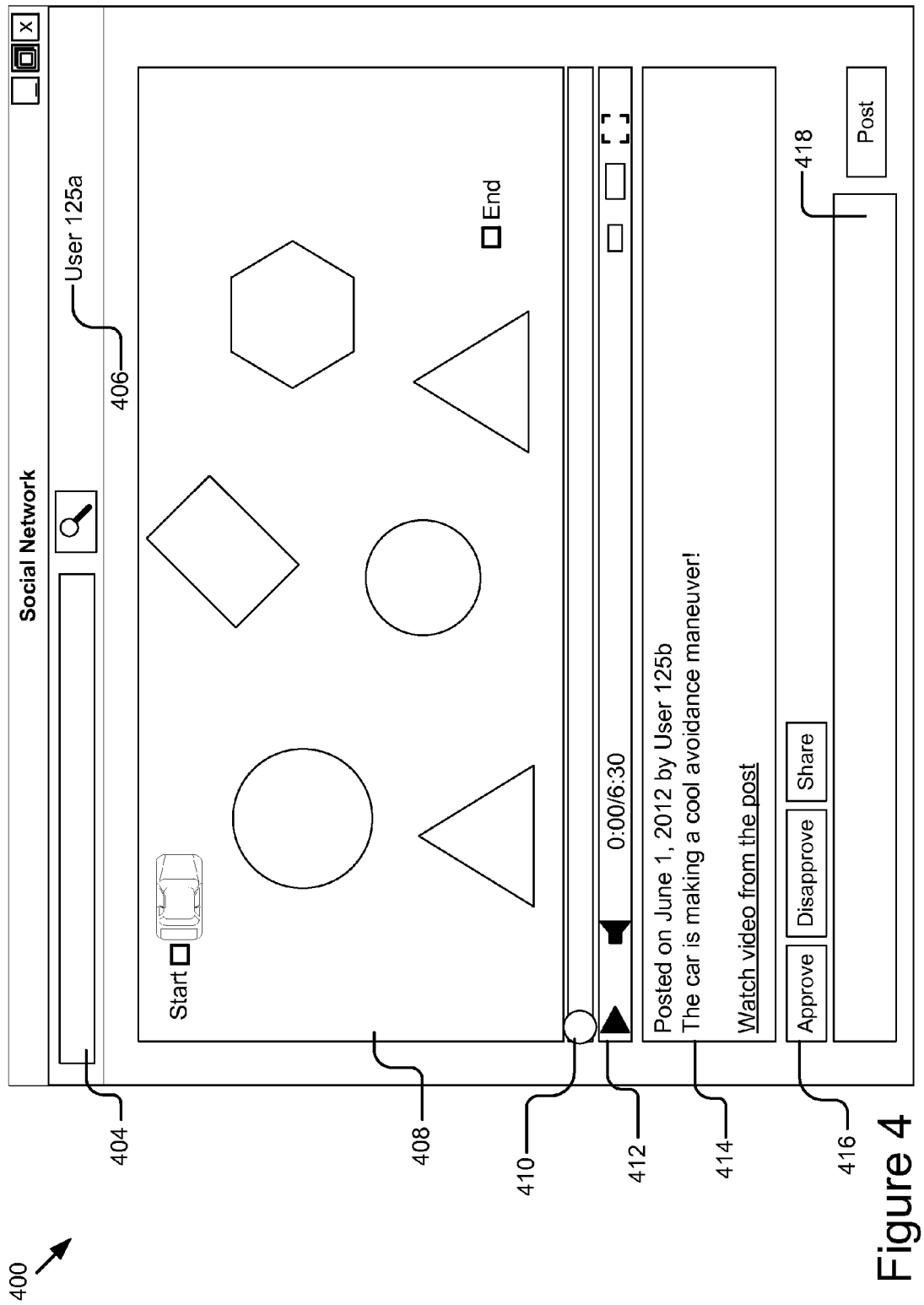
FIG. 4 is a graphical representation illustrating some example embodiments of a user interface for displaying a video starting at a tagged point.

Referring now to FIG. 4, some embodiments of a graphical representation of an example user interface 400 for displaying a video starting at a tagged point are illustrated. This user interface 400 is indicated as displayed on any of the one or more of user devices 115a through 115n. The user interface 400 allows the user to search the video by typing the name or key words of the video in a textbox display (visually displayed) indicated by reference numeral 404. Reference numeral 406 indicates the current user name (user 125a). The user interface 400 displays a video indicated by reference numeral 408. Reference numeral 410 indicates a progress bar showing the current time of the video instance. The user interface 400 allows a user to either play or execute a pause in the video stream and to adjust the volume of the video via a control bar indicated by reference number 412. In some implementations, the media stream may start automatically, (e.g., in silent mode or as an animated gif). In some implementations, (e.g., in the case of an audio stream) the current post may play automatically. When the video is played up to a specific scene in the video stream, the user can execute a pause the video stream and post comments to the specific scene in the video stream. In some implementations, the user may simply post comments while the media is streaming or playing, without executing a pause. The user interface 400 may also be configured to provide two options for the user to view the video. The user may view the video from the beginning or start (by selecting the "play" button or visual display provided in the control bar 412), or the user can also read a post indicated by reference numeral 414 before viewing the video, and then choose to view the video, starting from the scene in the video stream to which the post is tagged, by selecting the "Watch video from the post" link provided within the post 414. The user-interface 400 also allows the user to provide his or her feedback on the video. In some implementations, the user can choose to either, approve, disapprove, or share the video by clicking the "Approve," "Disapprove," and "Share" buttons or visual display components or icons, indicated by reference numeral 416. In some implementations, the user interface may not have these options or interactive buttons facilitating them. The textbox indicated by reference numeral 418 allows the user to post his/her comments to a specific scene.

Figure 5:
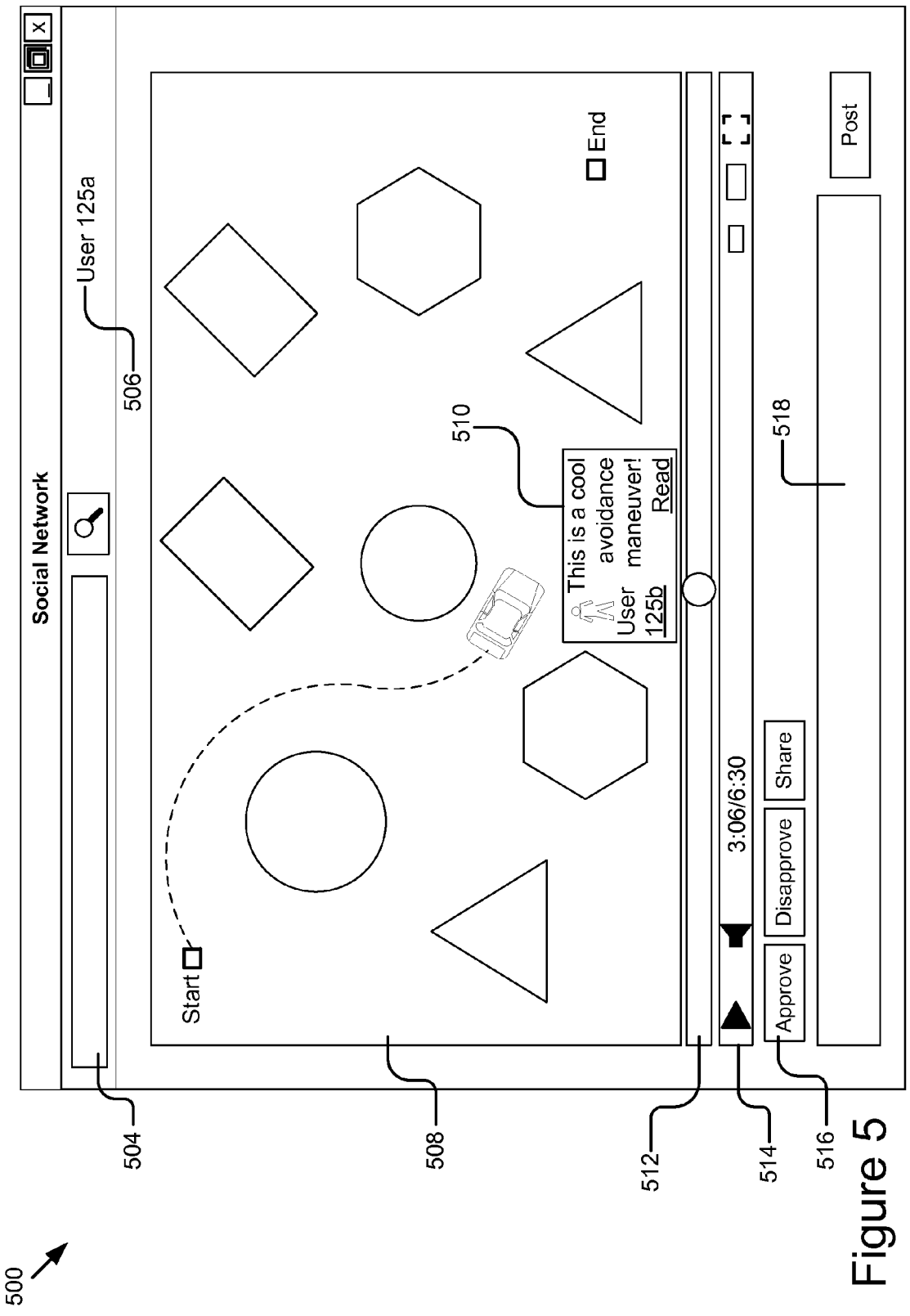
FIG. 5 is a graphical representation illustrating some example embodiments of a user interface for surfacing a post within a video stream.

Referring now to FIG. 5, some embodiments of a graphical representation of an example user interface 500 for surfacing a post in a video stream are illustrated. This user interface 500 is indicated as displayed on one or more user devices 115*a* through 115*n*. The user interface 500 allows the user to search through the video stream, by typing a name or key words relating to the video in the textbox, indicated by reference numeral 504. Reference numeral 506 indicates the current user name (in this example instance, user 125*a*) and reference numeral 508 indicates a video displayed by the user interface 500. The user interface 500 surfaces an indication/message about a post indicated by reference numeral 510 when the video is played to a specific point (for example, 3:06 as indicated in FIG. 5). Upon displaying the indication/message, the user can execute a pause in the video and read the post. In some implementations, the user may read the comments while the media is streaming or playing (without executing a pause to stop it). Reference numeral 512 indicates a progress bar showing the current time instant of the video. The user interface 500 allows a user to either play or execute a pause the video stream and to adjust the volume of the video through a control bar indicated by reference number 514. When the video is played to some specific scene, the user can execute a pause to the video stream and post additional comments to the post. In some implementations, the user may post additional comments while the media is streaming or playing, without executing a pause. The user interface 500 allows a user to give his or her feedback on the video. In some implementations, the user can choose to either approve, disapprove, and/or share the video by clicking the buttons or visual displays indicated as "Approve," "Disapprove," and "Share" as indicated by reference numeral 516. In some implementations, the user interface may not have these options or interactive buttons to execute them. In some embodiments, the user can press a "pause" button in the toolbar 514, and post a comment in the textbox 518. This post will reference the specific point and/or scene in which the user is paused. The textbox indicated by reference numeral 518 allows the user to post his/her comments to a specific scene.

Figure 6A:
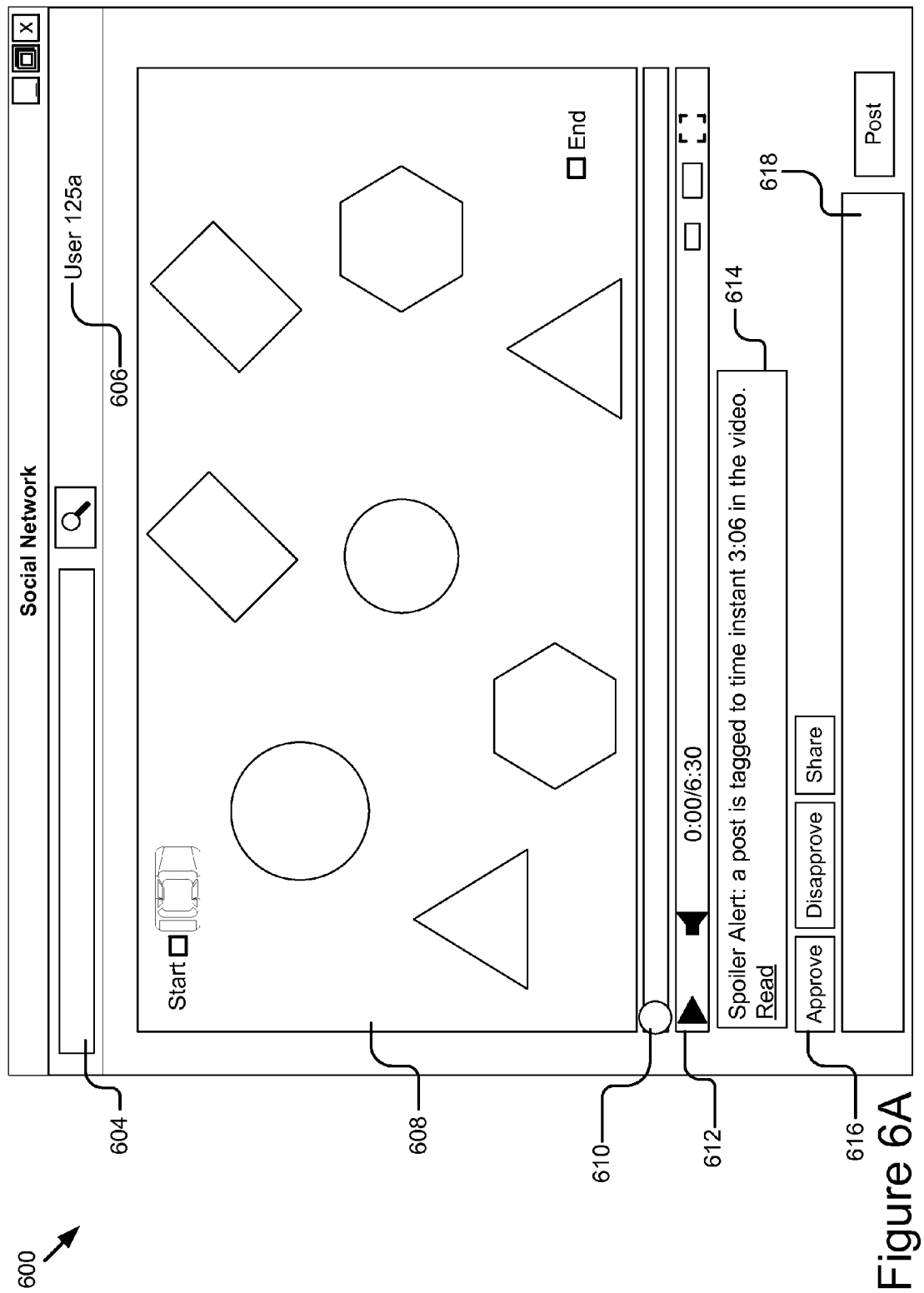
FIGS. 6A and 6B are graphical representations illustrating some example embodiments of a user interface for generating a spoiler alert.

Referring now to FIG. 6A, some embodiments of a graphical representation of a user interface 600 for displaying a spoiler alert are illustrated. This user interface 600 is indicated as displayed on any one or more of user devices 115*a* through 115*n*. The user interface 600 allows the user to search the video by typing a name or key words relating to the video in the textbox indicated by reference numeral 604. Reference numeral 606 indicates the current user name (user 125*a*) and reference numeral 608 indicates the video displayed by the user interface 600. Reference numeral 610 indicates a progress bar showing the current time instant of the video. The user interface 600 allows a user to play/pause the video and to adjust the volume of the video through a control bar indicated by reference number 612. When the video is played to some specific scene in the video stream, the user can execute a pause in the video stream and post comments on the specific scene to the specific scene instance in the video stream. In some implementations, the user may post comments on the specific scene while the media is streaming or playing (without executing a pause). The user interface 600 may also provide two options for the user to view the video. Reference numeral 614 indicates a spoiler alert for a post tagged to the time instant 3:06 in the video stream. The details of the post have been withheld to protect the user from "spoiling" the video. The user has the option to further read the post by clicking the link "Read" within the spoiler alert 614. The user interface 600 may also be configured to allow the user to give his or her feedback on the video. In some implementations, the user can choose to either approve, disapprove, and/or share the video by clicking buttons or visual displays designated by indications to "Approve," "Disapprove," and/or "Share," as indicated by reference numeral 616. In some implementations, the user interface may not have these options or interactive buttons to facilitate them. The textbox indicated by reference numeral 618 allows the user to post his/her comments to a specific scene.

Figure 6B:
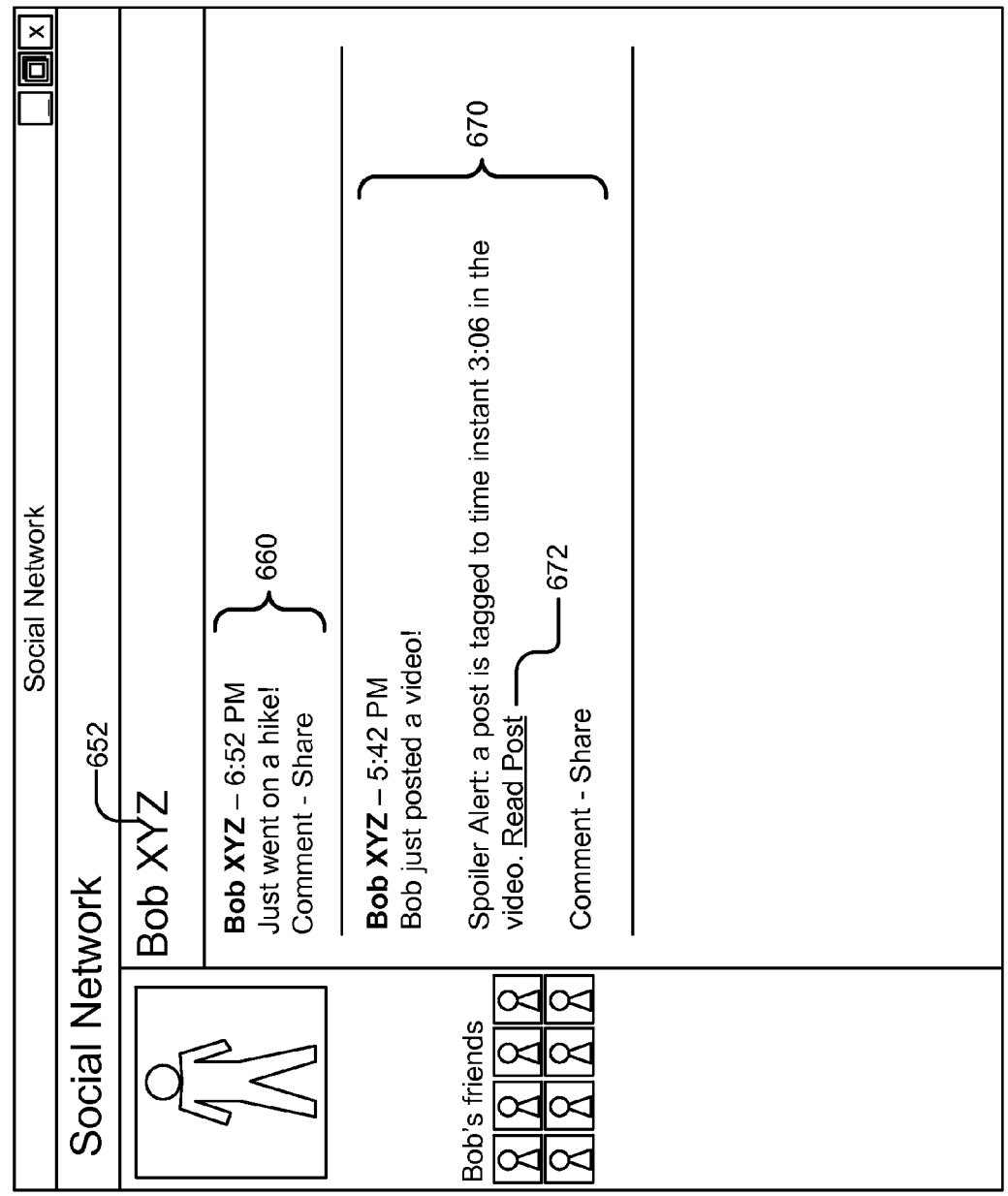

Referring now to FIG. 6B, some embodiments of a graphical representation of a user interface 650 for displaying a spoiler alert are illustrated. This user interface 650 is indicated as displayed on any one or more of user devices 115*a* through 115*n*. The user interface 650 indicates a user 652 (Bob XYZ) and his corresponding social network feed. Reference numeral 660 indicates an example post relating to the user 652 (Bob XYZ). Reference numeral 670 indicates an example post relating to user 652 (Bob XYZ) (in this example, Bob XYZ posted a video) and a corresponding spoiler alert for a post tagged to the time instant 3:06 in the video stream. As illustrated in this example, the details of the post have been withheld to protect the user from "spoiling" the video. The user has the option to further read the post by clicking the link "Read Post" within the post 670.

In the preceding description, for purposes of explanation, numerous specific details are indicated in order to provide a thorough understanding of the technology described. It should be apparent, however, to one skilled in the art, that this technology can be practiced without these specific details. In other instances, structures and devices are shown in block diagram form in order to avoid obscuring the technology. For example, the present technology is described with some embodiments above with reference to user interfaces and particular hardware. However, the present technology applies to any type of computing device that can receive data and commands, and any devices providing services. Moreover, the present technology is described above primarily in the context of providing support for tagging a post to a specific point in a media stream; however, those skilled in the art should understand that the present technology applies to any type of communication and can be used for other applications beyond posts. In particular, this technology for tagging information to a media stream may be used in other contexts besides posts.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment" in various places in the specification are not necessarily all referring to the same embodiment.

Some portions of the detailed descriptions that precede are presented in terms of algorithms and symbolic representations of operations on data bits within a computer memory of either one or more computing devices. These algorithmic descriptions and representations are the means used by those skilled in the data processing arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the preceding discussion, it should be appreciated that throughout the description, discussions utilizing terms such as "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology can take the form of an entirely hardware embodiment, an entirely software embodiment, or an embodiment including both hardware and software components. In some embodiments, this technology is implemented in software, which includes but is not limited to firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description above. In addition, the present technology is not described with reference to any particular programming language. It should be understood that a variety of programming languages may be used to implement the technology as described here.

The foregoing description of the embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method, comprising:
   receiving, using at least one computing device, a post from a particular user regarding a media stream;
   tagging, using the computing device, the post to a specific region in the media stream;
   generating, using the computing device, an indication of the post;
   providing for display prior to playing the media stream to a viewing user who has not previously interacted with the media stream, using the computing device, the indication of the post notifying the viewing user who has not previously interacted with the media stream of an existence of the post at the specific region in the media stream;
   generating, using the computing device, a viewing option for the viewing user who has not previously interacted with the media stream to choose a starting point of the media stream, the viewing option including an option to start the media stream from the specific region in the media stream to which the post is tagged in response to the provided indication of the post;
   responsive to the viewing user of the media stream that has not previously interacted with the media stream selecting the viewing option, automatically generating, using the computing device, a spoiler alert for the viewing user who has not previously interacted with the media stream, the spoiler alert being configured to indicate that the post is tagged at the specific region in the media stream;
   responsive to the viewing user of the media stream that has not previously interacted with the media stream approaching the specific region in the media stream associated with the post, providing, using the computing device, the spoiler alert for display to the viewing user, the spoiler alert including a first portion of the post and hiding a second portion of the post associated with content of the media stream from view to the viewing user;
   receiving, using the computing device, an action by the viewing user, responsive to the displaying of the spoiler alert associated with the post; and
   in response to the action, surfacing, using the computing device, the second portion of the post for display to the viewing user at the specific region in the media stream.

2. A computer-implemented method for surfacing a post, the method comprising:
   receiving, using at least one computing device, the post from a particular user regarding the media stream;
   tagging, using the computing device, the post to a specific region in the media stream;
   generating, using the computing device, an indication of the post;
   providing for display prior to playing the media stream to a viewing user who has not previously interacted with the media stream, using the computing device, the indication of the post notifying the viewing user who has not previously interacted with the media stream of an existence of the post at the specific region in the media stream;
   generating, using the computing device, a viewing option for the viewing user who has not previously interacted with the media stream to choose a starting point of the media stream, the viewing option including an option to start the media stream from the specific region in the media stream to which the post is tagged in response to the provided indication of the post;
   responsive to the viewing user of the media stream that has not previously interacted with the media stream selecting the viewing option, generating, using the computing device, a spoiler alert configured to indicate that the post is tagged in the media stream for the viewing user who has not previously interacted with the media stream;
   providing for display, using the computing device, the spoiler alert based on the viewing user, the spoiler alert including a first portion of the post and hiding a second portion of the post from view to the viewing user;
   receiving, using the computing device, an action by the viewing user responsive to the indication of the post and the spoiler alert associated with the post; and
   in response to the action, surfacing, using the computing device, the second portion of the post for display to the viewing user at the specific region in the media stream.

3. The computer-implemented method of claim 2, further comprising:
   executing, using the computing device, a play of the media stream at the specific region; and
   starting the media stream, using the computing device, from the specific region in the media stream.

4. The computer-implemented method of claim 3, wherein the action is sending the post to one or more other users with whom the user wants to share the post.

5. The computer-implemented method of claim 3, wherein the action is configured to start the media stream from the specific region for user consumption.

6. The computer-implemented method of claim 2, further comprising:
   receiving, using the computing device, a response to the spoiler alert; and
   providing, using the computing device, the post for display.

7. The computer-implemented method of claim 2, further comprising:
   in response to consuming the media stream, removing, using the computing device, the spoiler alert.

8. The computer-implemented method of claim 2, further comprising:
   providing for display, using the computing device, the post at a starting point in the media stream.

9. The computer-implemented method of claim 2, further comprising:
   executing a pause action, using the computing device, at the specific region in the media stream; and
   tagging, using the computing device, the post to the specific region in the media stream.

10. A system for surfacing a post, the system comprising:
    a processor; and
    a memory, wherein the processor and memory are communicatively coupled and further comprise:
       a post-tagging module configured to receive the post from a particular user relating to the media stream, configured to tag the post to a specific region in the media stream, and configured to generate an indication of the post;

a user-interface module configured to provide for display, prior to playing the media stream to a viewing user who has not previously interacted with the media stream, the indication of the post notifying the viewing user who has not previously interacted with the media stream of an existence of the post at the specific region in the media stream, the user interface module further configured to generate a viewing option for the viewing user who has not previously interacted with the media stream to choose a starting point of the media stream, the viewing option including an option to start the media stream from the specific region in the media stream to which the post is tagged in response to the provided indication of the post, the user-interface module further configured to provide for display a spoiler alert based on the viewing user, the spoiler alert including a first portion of the post and hiding a second portion of the post from view to the viewing user;

responsive to the viewing user of the media stream that has not previously interacted with the media stream selecting the viewing option, a spoiler-alert-generation module configured to generate the spoiler alert configured to indicate that the post is tagged in the media stream for the viewing user who has not previously interacted with the media stream; and a post-surfacing module configured to receive an action by the viewing user responsive to the indication of the post, and the spoiler alert associated with the post and in response to the action, surfacing the second portion of the post for display to the viewing user at the specific region in the media stream.

11. The system of claim 10, further comprising:

a media-display module for executing an action to play the media stream from the specific region; and the user-interface module for providing the media stream for display from the specific region.

12. The system of claim 11, wherein the action includes sending the post to another user.

13. The system of claim 11, wherein the action includes viewing the media stream from the specific region.

14. The system of claim 10, further comprising:

a spoiler-alert-removal module for receiving a response to the spoiler alert; and the user-interface module for providing the post for display.

15. The system of 14, further comprising:

the spoiler-alert-removal module for removing the spoiler alert in response to viewing the media stream.

16. The system of claim 10, wherein the user-interface module provides the post for display at a beginning point of the media stream.

17. The system of claim 10, wherein the post-tagging module executes a pause action within the media stream at the specific region and tags the post to the specific region in the media stream.

* * * * *